Patented Oct. 14, 1947

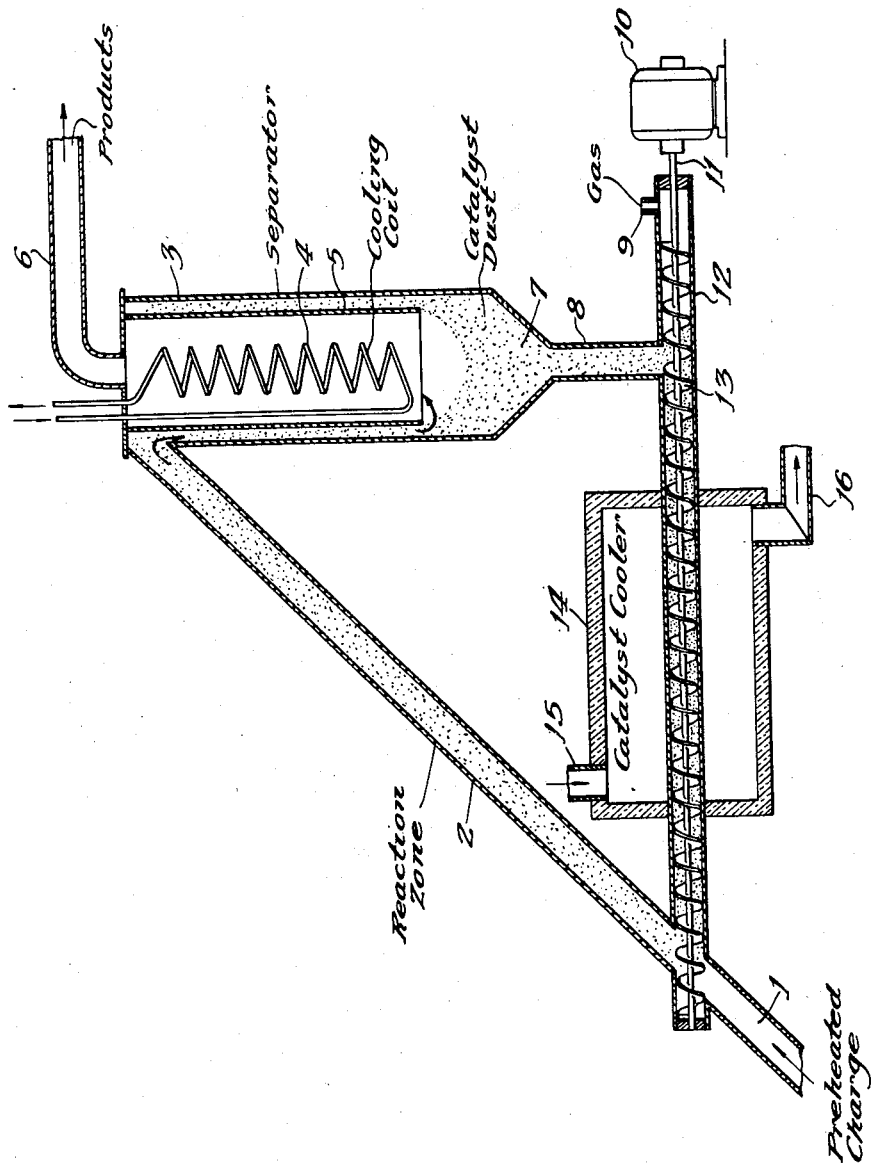

2,428,914

UNITED STATES PATENT OFFICE 2,428,914

PROCESS FOR EFFECTING EXOTHERMIC CATALYTIC REACTIONS

Louis S. Kassel, Riverside, Ill., assignor to Universal Oil Products Company, Chicago, Ill., a corporation of Delaware Application January 24, 1945, Serial No. 574,387

6 Claims. (Cl. 260—683.15)

This application is a continuation-in-part of my co-pending application Serial No. 253,484, filed January 30, 1939, now Patent No. 2,403,375, July 2, 1946.

This invention relates to processes for effecting catalyzed reactions and particularly those occurring under substantially vapor phase conditions.

It is more specifically concerned with a method of catalyzing vapor phase reactions among organic compounds and particularly hydrocarbons which involves a considerable departure from the methods ordinarily employed in that instead of passing the vapors of reactants through stationary beds of granular catalytic materials, the vapors are caused to carry more finely divided powdered catalysts so that considerably more catalytic surface is exposed and the effectiveness of the catalyst is greatly increased. While the principles of the invention to be presently disclosed are more particularly applicable to catalyzing vapor phase reactions, they may be applied with suitable and more or less obvious modification to mixed phase reactions or liquid phase reactions.

The invention further embodies novel ideas in the matter of accurate control of the temperatures of catalyzed reaction zones without direct heat exchange between said reaction zone and its surroundings. This is accomplished by using the catalyst as a heat carrier or temporary heat reservoir so that heat flows from reactants to catalyst to prevent undesirably high temperatures in exothermic reactions.

The present process is more particularly directed to catalyzed reactions among hydrocarbons such as the gaseous and liquid fractions of petroleum and also individual hydrocarbon compounds which are in general vaporizable under ordinary temperatures and pressures without material decomposition. Such reactions may include polymerization reactions in which normally gaseous olefins are converted into normally liquid compounds, and hydrogenation reactions of all types. These types of reactions are of primary importance in the present stage of the development of the petroleum industry which depends upon them for the more complete utilization of an important natural resource.

The types of reactions mentioned as those to which the present process can be applied may use a variety of catalysts. Recognized hydrogenation catalysts include metals of the iron group and the oxides of chromium, molybdenum, and tungsten. Polymerizing catalysts include a number of mineral acids on granular supports such as, for example, the so-called solid phosphoric acid catalysts, and polymerization may also be effected by natural and artificial silicates.

In one specific embodiment the present invention comprises in a process wherein a fluid reactant and a subdivided catalyst are passed through a reaction zone and the fluid exothermically reacted at a reaction temperature while in contact with the subdivided catalyst in said zone thereby generating exothermic heat of reaction tending to increase the temperature prevailing in said zone, the method of preventing excessive temperature rise in the reaction zone which comprises introducing to said zone, during the exothermic reaction therein, subdivided solid catalyst at a temperature substantially below said reaction temperature and in sufficient amount to absorb at least a major portion of said exothermic heat of reaction.

It will be seen from the foregoing general statement as to the type of process involved in the present invention that it has a wide applicability and that many types of apparatus can be employed in commercial practice. The particular design of such apparatus will depend upon many factors including the type of reaction, the catalyst used, the temperature, pressure, and time of contact, which are found optimum for accomplishing best results, the amount of carbonaceous materials formed in the course of the reaction, and various problems involving corrosion and the use of different types of metals.

The attached drawing shows diagrammatically and without regard to any absolute or relative scale an arrangement of apparatus which may be utilized to carry out the steps of the process.

Referring to the drawing, line 1 is shown as an inlet line for vapors or liquid which are to be reacted in the presence of catalysts, such as, for example, preheated vapors of hydrocarbons which are to be hydrogenated. As the vapors or liquid pass through the tube they receive powdered catalyst at a regulated rate from line 12 containing a screw conveyor 13. By adjusting the rates of flow of reactants and catalyst and proportioning the amount of catalyst added reactions are instigated leading to the formation of desired products. After passing through reaction zone 2, the products enter a separator 3 which may be of any suitable type such as a cyclone separator which produces a swirling motion promoting centrifugal separation of particles or it may be in some instances of the electrical precipitator type. In order to reduce the temperature of the products to a point below the reaction temperature a cooling coil 4 is shown which is provided to quench the products and stop the reactions at any desired point. A cylinder 5 integral with the top of the separator and open at the bottom indicates a baffle for directing the inlet materials downwardly and increasing the efficiency of the separation so that no catalyst particles are carried upwardly with the products of the reaction which are withdrawn to fractionation or other disposal through line 6. Catalyst dust indicated at 7 after settling in the bottom of the separator passes through line 8 into return line 12 from which it is sent back to the reaction zone as already mentioned. Line 12 may contain a conveying screw 13 mounted on a shaft 11 actuated by a motor 10. In order to prevent carbonization of the deposits on the catalyst particles during their return to the reaction zone, an additional conveying effect may be had by admitting hydrogen or an inert gas through line 9 in a steady stream. Reference numeral 14 indicates a cooler for bringing the powdered catalyst back to an optimum temperature and such a cooler may have inlet line 15 and exit line 16 for the admission and evacuation of cooling fluids.

The above description of the method of operation of the process is given in very simple outline with the object of making clear the basic features of the invention without complicating the issue by the introduction of a mass of operating details which are readily taken care of by those conversant with these types of operations. It will be seen from the foregoing description that the invention refers to the cyclic use of powdered catalyst in organic and particularly hydrocarbon exothermic reactions wherein the powdered catalyst itself is utilized to maintain a desired average reaction temperature.

The proportions of catalyst dust and gas are such that the heat capacity of the dust is substantial in comparison with that of the gas. The dust is brought to a temperature substantially below the desired reaction temperature, the gas is separately brought to substantially the desired reaction temperature, and the two are then commingled in the desired proportions by means of an injector, a screw feed, or any other suitable device. By employing catalyst in sufficient quantity and at an introduction temperature substantially below that of the desired reaction temperature the exothermic heat of reaction will be absorbed without a substantial rise in the temperature of the reaction zone. The reaction vessel may consist, for example, of a coil or bank of pipes in series connection or of a single large vessel. The large heat capacity of the dust acts as a reservoir, so that the heat of reaction does not appreciably affect the temperature. When the catalyst is introduced to the reaction zone at a temperature below the desired reaction temperature and in amounts such that the heat capacity is large with respect to the heat capacity of the reactants there may be a slight temperature rise through the reaction zone but the magnitude of this increase can be held to an insignificant figure. Heat transfer through the walls of the reaction vessel is therefore not required. This fact permits the use of large diameter pipes or vessels. The mixture of gas and catalyst leaving the reaction vessel is separated by the use of an electro-static precipitator, a cyclone, or other suitable means. The catalyst is recycled, suitable arrangements being made to adjust its heat content. The exit gases are subjected to whatever other processing is desired.

As an example of the operation of the process the following is given without any intent of limiting its proper scope as previously described.

A cracked gasoline may be hydrogenated to improve its stability and reduce its sulfur content by mixing 1 mol of vapors of the gasoline with two mols of a gas mixture consisting of 60% hydrogen and 40% methane and passing the gas-vapor mixture through a reaction chamber at substantially atmospheric pressure and a temperature of 400° F. using a liquid hourly space velocity of 0.35. The reactor volume is 1000 gallons and the ordinary temperature rise without catalyst addition in sufficient quantity to prevent it, would be about 600° F. during the passage of the oil vapors and hydrogen through the reactor. Using a catalyst concentration of 0.5 lb./cu. ft. of reaction space and a catalyst circulation of 300 lb./min. for a 200 bbl./day plant, the plant may be operated so that the inlet temperature is 350° F. and the outlet temperature is about 450° F. so that the average is substantially 400° F. The catalyst employed may consist of reduced nickel on a kieselguhr support.

I claim as my invention:

1. In a process wherein a fluid reactant and a subdivided solid catalyst are passed through a reaction zone and the fluid exothermically reacted at a reaction temperature while in contact with the subdivided catalyst in said zone, thereby generating exothermic heat of reaction tending to increase the temperature prevailing in said zone, the method of preventing excessive temperature rise in the reaction zone which comprises introducing to said zone, during the exothermic reaction therein, subdivided solid catalyst at a temperature substantially below said reaction temperature and in sufficient amount to absorb at least the major portion of said exothermic heat of reaction.

2. In the catalytic conversion of hydrocarbons wherein a hydrocarbon reactant and a subdivided solid catalyst are passed through a reaction zone and the reactant exothermically reacted at a hydrocarbon conversion temperature while in contact with the catalyst in said zone, thereby generating exothermic heat of reaction tending to increase the temperature prevailing in said zone, the method of preventing excessive temperature rise in the reaction zone which comprises introducing to said zone, during the exothermic reaction therein, subdivided solid catalyst at a temperature substantially below said conversion temperature and in sufficient amount to absorb at least the major portion of exothermic heat of reaction.

3. In the catalytic conversion of hydrocarbons wherein a hydrocarbon reactant and a subdivided solid catalyst are passed through a reaction zone and the reactant exothermically reacted at a hydrocarbon conversion temperature while in contact with the catalyst in said zone, thereby generating exothermic heat of reaction tending to increase the temperature prevailing in said zone, the method which comprises preheating the hydrocarbon reactant being supplied to said zone to approximately said conversion temperature, and introducing to the reaction zone, simultaneously with the supply of the preheated reactant thereto, subdivided solid catalyst at a temperature substantially below said conversion temperature and in sufficient amount to absorb at least the major portion of said exothermic heat of reaction, whereby to prevent excessive temperature rise in the reaction zone.

4. In a process wherein a gaseous reactant and a subdivided solid catalyst are passed through a reaction zone and the gaseous reactant exothermically reacted at a reaction temperature while in contact with the subdivided catalyst in said zone thereby generating exothermic heat of reaction tending to increase the temperature prevailing in said zone, the method of preventing excessive temperature rise in the reaction zone which comprises introducing to said zone, during the exothermic reaction therein, subdivided solid catalyst at a temperature substantially below said reaction temperature and in sufficient amount to absorb at least the major portion of said exothermic heat of reaction.

5. In the catalytic polymerization of hydrocarbons wherein a hydrocarbon reactant and a subdivided solid polymerization catalyst are passed through a reaction zone and the reactant exothermically reacted at a polymerization temperature while in contact with the catalyst in said zone thereby generating exothermic heat of reaction tending to increase the temperature prevailing in said zone, the method of preventing excessive temperature rise in the reaction zone which comprises introducing to said zone, during the exothermic reaction therein, subdivided solid polymerization catalyst at a temperature substantially below said polymerization temperature and in sufficient amount to absorb at least the major portion of said exothermic heat of reaction.

6. In the catalytic hydrogenation of hydrocarbons wherein a hydrocarbon reactant and a subdivided solid hydrogenation catalyst are passed through a reaction zone and the reactant exothermically reacted at a hydrogenation temperature while in contact with the catalyst in said zone thereby generating exothermic heat of reaction tending to increase the temperature prevailing in said zone, the method of preventing excessive temperature rise in the reaction zone which comprises introducing to said zone, during the exothermic reaction therein, subdivided solid hydrogenation catalyst at a temperature substantially below said hydrogenation temperature and in sufficient amount to absorb at least the major portion of said exothermic heat of reaction.

LOUIS S. KASSEL.

REFERENCES CITED

The following references are of record in the file of this patent:

UNITED STATES PATENTS

| Number | Name | Date |
| --- | --- | --- |
| 2,161,974 | Peck | June 13, 1939 |
| 2,201,306 | Subkow | May 21, 1940 |
| 2,206,729 | Pier | July 2, 1940 |
| 2,253,486 | Belchetz | Aug. 19, 1941 |
| 2,259,486 | Carpenter | Oct. 21, 1941 |
| 2,289,329 | Prickett | July 7, 1942 |
| 2,231,424 | Huppke | Feb. 11, 1941 |
| 2,146,667 | Atwell | Feb. 7, 1939 |
| 2,231,231 | Subkow | Feb. 11, 1941 |
| 2,256,969 | Barr | Sept. 23, 1941 |

FOREIGN PATENTS

| Number | Country | Date |
| --- | --- | --- |
| 127,245 | Switzerland | Aug. 16, 1928 |